United States Patent
Frazier et al.

(10) Patent No.: US 10,083,134 B2
(45) Date of Patent: Sep. 25, 2018

(54) CONFIGURABLE PROCESSOR INTERRUPTS FOR ALLOWING AN APPLICATION TO INDEPENDENTLY HANDLE INTERRUPTS

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 14/953,309

(22) Filed: Nov. 28, 2015

(65) Prior Publication Data

US 2017/0153991 A1    Jun. 1, 2017

(51) Int. Cl.
*G06F 13/32* (2006.01)
*G06F 13/24* (2006.01)
*G06F 9/445* (2018.01)
*G06F 13/26* (2006.01)

(52) U.S. Cl.
CPC .......... *G06F 13/24* (2013.01); *G06F 9/44505* (2013.01); *G06F 13/26* (2013.01)

(58) Field of Classification Search
USPC ................................................. 710/260–269
See application file for complete search history.

(56) References Cited

U.S. PATENT DOCUMENTS

| | | | |
|---|---|---|---|
| 6,880,030 B2 * | 4/2005 | Brenner, Jr. | G06F 9/4812 710/262 |
| 7,536,694 B2 * | 5/2009 | Blinick | G06F 9/3861 710/260 |
| 8,065,349 B2 | 11/2011 | Wright et al. | |
| 8,429,658 B2 | 4/2013 | Auerbach et al. | |
| 9,092,255 B2 * | 7/2015 | Yamauchi | G06F 13/24 |
| 9,460,032 B2 * | 10/2016 | Ryu | G06F 13/24 |
| 2009/0300249 A1 * | 12/2009 | Moyer | G06F 11/2236 710/260 |
| 2011/0154347 A1 * | 6/2011 | Nemirovsky | G06F 9/4818 718/103 |
| 2012/0089761 A1 * | 4/2012 | Ryu | G06F 13/24 710/267 |
| 2015/0006869 A1 * | 1/2015 | Ehrlich | G06F 11/3636 712/244 |

OTHER PUBLICATIONS

C. DeLozier, "Low Pause-Time Garbage Collection Written Preliminary Examination II", The University of Pennsylvania, 2011, pp. 1-19.
F.Pizlo, et al., "Hierarchical Real-time Garbage Collection" ACM, Proceedings, vol. 42, Issue 7, Jul. 7, 2007, pp. 1-11.

\* cited by examiner

*Primary Examiner* — Raymond Phan
(74) *Attorney, Agent, or Firm* — Cantor Colburn LLP; Steven Chiu

(57) ABSTRACT

Embodiments relate to configurable processor interrupts. An aspect includes sending, by an application to supervisor software in a computer system, a request, the request including a plurality of exception types to be handled by the application. Another aspect includes determining, by the supervisor software, a subset of the plurality of exception types for which to approve handling by the application. Yet another aspect includes sending a response from the supervisor software to the application notifying the application of the subset of exception types.

17 Claims, 3 Drawing Sheets

CONFIGURABLE PROCESSOR INTERRUPTS FOR ALLOWING AN APPLICATION TO INDEPENDENTLY HANDLE INTERRUPTS

BACKGROUND

The present invention relates generally to computer processor systems, and more specifically, to configurable processor interrupts in a computer processor system.

In computer systems that require a variety of system functions to be controlled in a nonsequential fashion, it is a common practice to employ interrupts to determine the order in which various operations are to be performed by the processor. An interrupt is generated in response to the occurrence of a predetermined event in the operation of the system. When the processor receives an interrupt request, it stops its present operation at an appropriate point and proceeds to a predetermined subroutine that controls the function associated with that particular interrupt. The predetermined condition may be an exception condition in the processor. The occurrence of an exception may result in generation of an interrupt that passes control from an application that was running at the time the exception occurred to supervisor software, so that the supervisor software can handle the exception. However, processing of interrupts by the supervisor software may negatively impact performance of the computer system.

SUMMARY

Embodiments include a method, system, and computer program product for configurable processor interrupts. An aspect includes sending, by an application to supervisor software in a computer system, a request, the request including a plurality of exception types to be handled by the application. Another aspect includes determining, by the supervisor software, a subset of the plurality of exception types for which to approve handling by the application. Yet another aspect includes sending a response from the supervisor software to the application notifying the application of the subset of exception types.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of configurable processor interrupts are provided, with exemplary embodiments being discussed below in detail. Instead of generating an interrupt that passes control to supervisor software based on encountering an exception condition, some exception conditions may be handled by the application via a lightweight interrupt, such as an event based branch (EBB). A system call is provided to request that a set of exception types trigger lightweight interrupts that are routed to the application during execution of the application. The supervisor software may approve or deny the request for each of the requested exception types. The supervisor software may comprise a hypervisor and/or an operating system (OS) in various embodiments.

Examples of exception types include, but are not limited to, performance monitor exceptions, floating-point exceptions, trap exceptions, divide by zero exceptions, out of bounds exceptions. Exceptions may also be generated corresponding to asynchronous events that occur in the processor. Such asynchronous events may include, but are not limited to, notifications regarding a change to a system parameter, a change in program priority, expiration of a system timer, or any other system change that could affect the application. An application may request to handle any types of exceptions via the system call. In some embodiments, the requested exception types may be determined by the application based on the capabilities of an exception handler in the application. For example, the application may issue the following system call to the supervisor software: REQUEST NOTIFICATION (requested exception types). This system call is used by the application to request that exceptions related to a selected set of exception types trigger lightweight interrupts.

The supervisor software responds to the system call from the application with the following response: GRANT NOTIFICATION (granted exception types). This response indicates the set of exceptions which the supervisor has determined are appropriate for handling by the application; the granted exception types may comprise less than all of the requested exception types. The supervisor may grant control over certain exceptions to the application based on whether the application is deemed capable of handling the exception. Control may be granted for exceptions that can be handled independently by the application without any side effects on other threads that are running in the processor.

Figure 1:
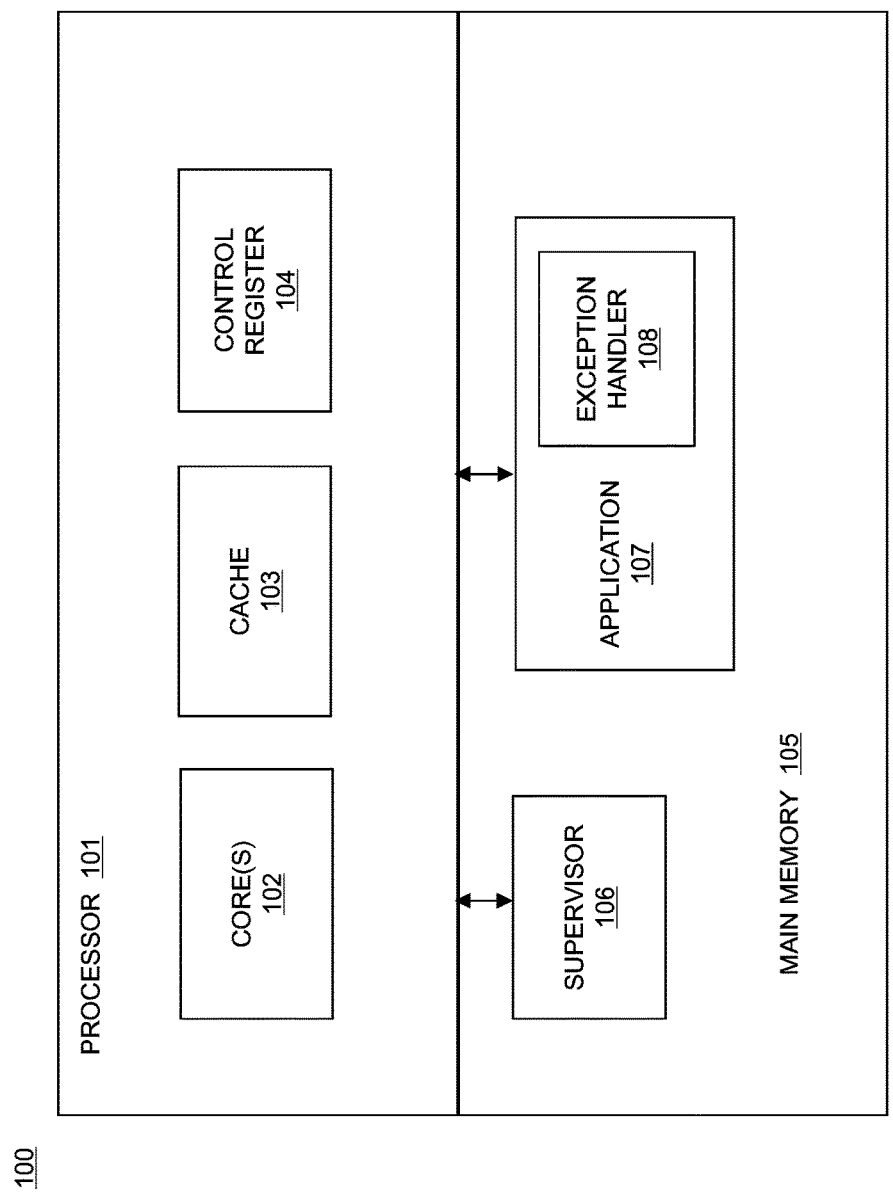
FIG. 1 depicts a computer system for configurable processor interrupts in accordance with an embodiment.

FIG. 1 depicts a computer system for implementing configurable processor interrupts in accordance with an embodiment. Computer system 100 includes a processor 101 in communication with a main memory 105. The processor 101 includes one or more cores 102 that execute instructions using cache memory 103. Computer programs, such as supervisor 106 and application 107, are stored in main memory 105 and executed by the processor 101. The supervisor 106 may include a hypervisor and/or an OS in various embodiments. Any appropriate number of applications such as application 107 may be executed by a computer system such as computer system 100. Exceptions may be generated by various conditions in the processor 101 during execution of application 107. Examples of exception types include, but are not limited to, performance monitor exceptions, floating-point exceptions, trap exceptions, divide by zero exceptions, out of bounds exceptions. Further exceptions may correspond to asynchronous events, such as a change to a system parameter, a change in program priority, expiration of a system timer, or any other system change that could affect the application, that occur during execution of application 107. When an exception occurs during execution of application 107, the exception may be either handled by an interrupt that passes control to the supervisor 106, or handled by a lightweight exception handler 108 in the application 107. In some embodiments, a control register 104 in processor 101 may indicate what types of exceptions are routed to supervisor 106, and what type of exceptions are routed to application 107. The application 107 may request that one or more exception types be routed to the application 107 instead of the supervisor 106 based on, for example, the capability of the exception handler 108. The supervisor 106 may approve or deny the request for each of the requested exception types, set the control register 104 accordingly, and notify the application 107.

Figure 2:
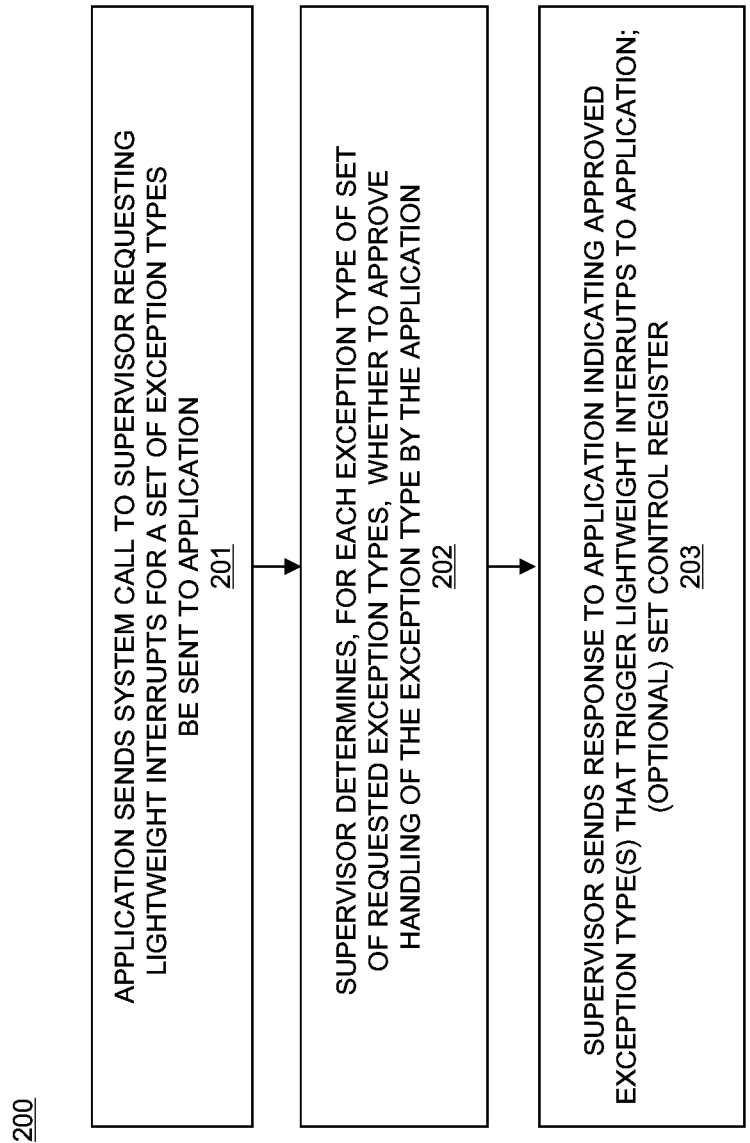
FIG. 2 depicts a process flow for configuring processor interrupts in accordance with an embodiment.

FIG. 2 illustrates an embodiment of a method 200 for configuring processor interrupts. Method 200 may be implemented in computer system 100 of FIG. 1. First, in block 201, the application 107 sends a system call comprising a request to the supervisor 106 requesting that a specific set of exception types be sent to the exception handler 108 in the application 107 for processing instead of to the supervisor 106 during execution of the application 107. For example, the application 107 may make the following request to the supervisor 106:

REQUEST NOTIFICATION (FP,D0,OOB, Priority)

In the above request, the application 107 is requesting to receive lightweight interrupts corresponding floating-point exceptions (FP), divide by zero exceptions (D0), out of bounds exceptions (OOB), and changes to priority. This request is shown for illustrative purposes only; in various embodiments, an application 107 may request notifications regarding any appropriate event in the processor 101, including but not limited to exceptions and asynchronous events.

Next, in block 202, the supervisor 106 determines, for each exception type included in the request of block 201, whether to grant the request. The supervisor 106 may use any criteria in determining the exception types for which to grant handling to the application 107. The decision may be made by the supervisor 106 based on determining the ability of the application 107 to handle the exception notifications without affecting other threads in the processor 101.

Then, in block 203, the supervisor 106 sends a response to the application 107 indicating which exception types of the set of requested exception types will trigger lightweight interrupts to the application based on the determination of block 202. For example, in response, the supervisor 106 may return the following response to the application 107:

GRANT NOTIFICATION (FP, D0, Priority)

In the above response, the supervisor 106 indicates that lightweight interrupts are granted for floating-point exceptions (FP), divide by zero exceptions (D0), and changes to priority, but has withheld granting control to the application 107 for out of bounds exceptions. In some embodiments of block 203, the supervisor 106 also sets the control register 104 to indicate, to the processor 101, the particular granted exceptions that are to be handled by the application 107. Any appropriate means of indicating, to the processor 101, the particular exceptions that are to be handled by the application 107 may be used in various embodiments.

Figure 3:
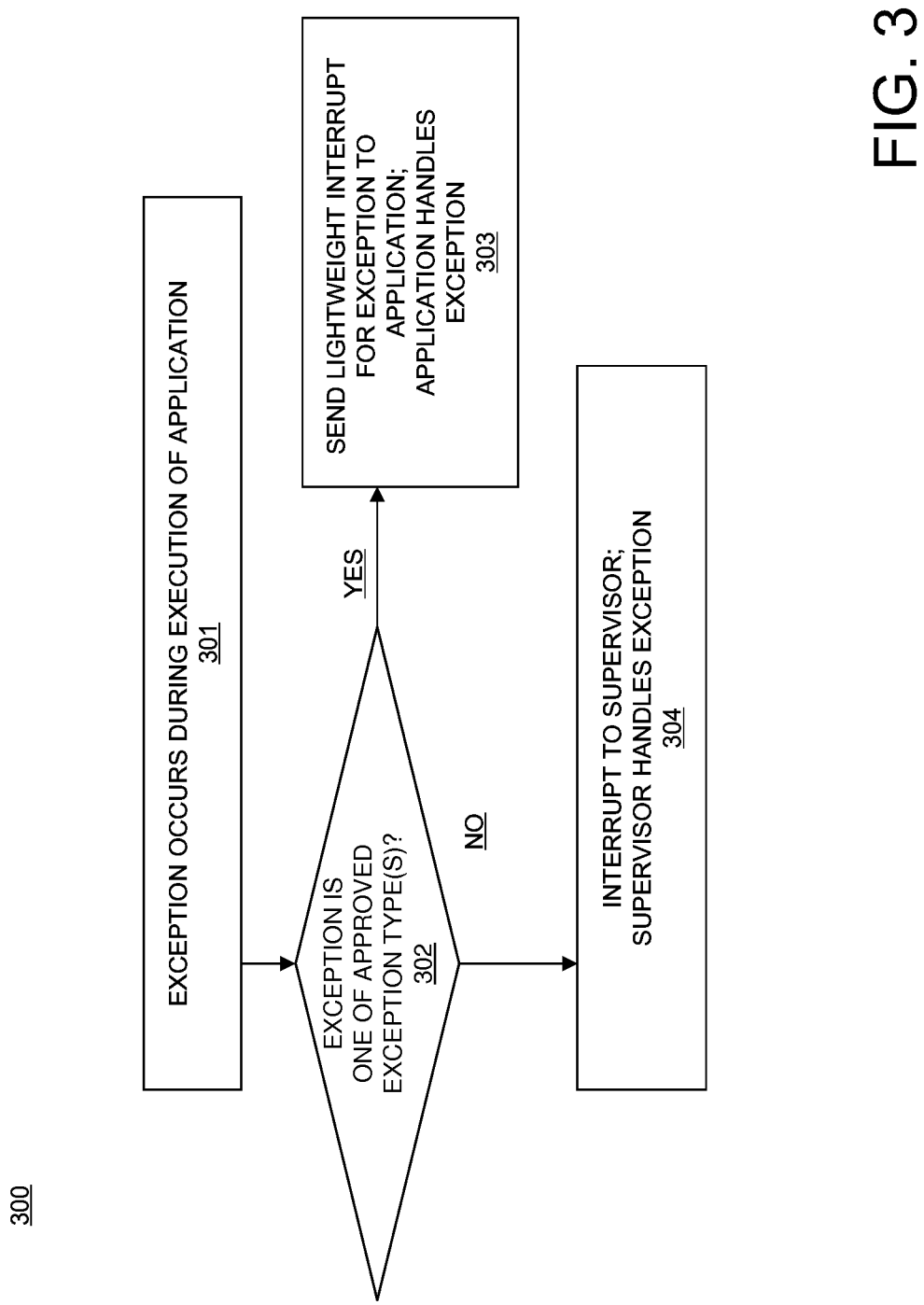
FIG. 3 depicts a process flow for handling configurable processor interrupts in accordance with an embodiment.

FIG. 3 illustrates an embodiment of a method 300 for handling configurable processor interrupts. Method 300 is implemented in computer system 100 of FIG. 1. First, in block 301, an exception occurs in the processor 101 during execution of application 107. In block 302, it is determined whether the type of the exception of block 301 is an exception type that was approved for handling by the application 107 in block 202 of FIG. 2. The determination of block 302 may be made based on control register 104 in some embodiments. If it is determined in block 302 that the exception type is an exception type that was approved for handling by the application 107, flow proceeds from block 302 to block 303, and the a lightweight interrupt corresponding to the exception is sent to exception handler 108 in the application 107. The exception handler 108 then handles the exception. If it is determined in block 302 that the exception type is not an exception type that was approved for handling by the application 107, flow proceeds from block 302 to block 304, and the exception generates an interrupt of control from the application 107 to the supervisor 106, so that the supervisor 106 can handle the exception.

Technical effects and benefits include improved performance in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for configurable interrupts for a processor, the method comprising:
    sending, by an application to supervisor software in a computer system, a request, the request including a plurality of exception types to be handled by the application;
    determining, by the supervisor software, a subset of the plurality of exception types for which to approve handling by the application;
    sending a response from the supervisor software to the application notifying the application of the subset of exception types;
    based on an exception occurring in a processor of the computer system during execution of the application, determining whether a type of the exception is one of the subset of exception types; and
    based on determining that the type of the exception is one of the subset of exception types, sending a lightweight interrupt corresponding to the exception to an exception handler in the application.

2. The method of claim 1, further comprising, based on determining that the type of the exception is not one of the subset of exception types, interrupting execution of the application and handling the exception by the supervisor software.

3. The method of claim 1, further comprising setting, by the supervisor software, a control register of the processor to indicate the subset of the plurality of exception types.

4. The method of claim 1, wherein the plurality of exception types comprises: performance monitor exceptions, floating-point exceptions, trap exceptions, divide by zero exceptions, out of bounds exceptions, and changes to priority.

5. The method of claim 1, wherein determining, by the supervisor software, the subset of the plurality of exception types for which to grant handling to the application is performed based on an ability of the application to handle each respective exception type of the plurality of exception types without interfering with any other threads in a processor of the computer system, and wherein at least one of the plurality of exception types is not in the subset of exception types.

6. The method of claim 3, wherein the determination of whether a type of an exception is one of the subset of exception types is made based on the control register.

7. A computer program product for implementing configurable interrupts for a processor, the computer program product comprising:
    a computer readable storage medium having program instructions embodied therewith, the program instructions readable by a processing circuit to cause the processing circuit to perform a method comprising:

sending, by an application to supervisor software in a computer system, a request, the request including a plurality of exception types to be handled by the application;

determining, by the supervisor software, a subset of the plurality of exception types for which to approve handling by the application;

sending a response from the supervisor software to the application notifying the application of the subset of exception types:, based on an exception occurring in a processor of the computer system during execution of the application, determining whether a type of the exception is one of the subset of exception types; and based on determining that the type of the exception is one of the subset of exception types, sending a lightweight interrupt corresponding to the exception to an exception handler in the application.

8. The computer program product of claim 7, the method further comprising, based on determining that the type of the exception is not one of the subset of exception types, interrupting execution of the application and handling the exception by the supervisor software.

9. The computer program product of claim 7, the method further comprising setting, by the supervisor software, a control register of the processor to indicate the subset of the plurality of exception types.

10. The computer program product of claim 7, wherein the plurality of exception types comprises: performance monitor exceptions, floating-point exceptions, trap exceptions, divide by zero exceptions, out of bounds exceptions, and changes to priority.

11. The computer program product of claim 7, wherein determining, by the supervisor software, the subset of the plurality of exception types for which to grant handling to the application is performed based on an ability of the application to handle each respective exception type of the plurality of exception types without interfering with any other threads in a processor of the computer system, and wherein at least one of the plurality of exception types is not in the subset of exception types.

12. The computer program product of claim 9, wherein the determination of whether a type of an exception is one of the subset of exception types is made based on the control register.

13. A computer system for configurable interrupts for a processor, the system comprising:
a memory; and
the processor, communicatively coupled to said memory, the computer system configured to perform a method comprising:
sending, by an application to supervisor software in a computer system, a request, the request including a plurality of exception types to be handled by the application;
determining, by the supervisor software, a subset of the plurality of exception types for which to approve handling by the application;
sending a response from the supervisor software to the application notifying the application of the subset of exception types;
based on an exception occurring in the processor during execution of the application, determining whether a type of the exception is one of the subset of exception types; and
based on determining that the type of the exception is one of the subset of exception types, sending a lightweight interrupt corresponding to the exception to an exception handler in the application.

14. The computer system of claim 13, the method further comprising, based on determining that the type of the exception is not one of the subset of exception types, interrupting execution of the application and handling the exception by the supervisor software.

15. The computer system of claim 13, the method further comprising setting, by the supervisor software, a control register of the processor to indicate the subset of the plurality of exception types.

16. The computer system of claim 13, wherein the plurality of exception types comprises: performance monitor exceptions, floating-point exceptions, trap exceptions, divide by zero exceptions, out of bounds exceptions, and changes to priority.

17. The computer system of claim 15, wherein the determination of whether a type of an exception is one of the subset of exception types is made based on the control register.

* * * * *